(12) United States Patent
Backa et al.

(10) Patent No.: US 6,365,092 B1
(45) Date of Patent: Apr. 2, 2002

(54) METHOD FOR PRODUCING A SINTERED POROUS BODY

(75) Inventors: Stefan Backa; Rebei Bel Fdhila; Markku Rissanen, all of Västerås (SE)

(73) Assignee: ABB Lummus Global, Inc., Bloomfield, NJ (US)

( * ) Notice: Subject to any disclaimer, the term of this patent is extended or adjusted under 35 U.S.C. 154(b) by 0 days.

(21) Appl. No.: 09/338,060

(22) Filed: Jun. 23, 1999

(51) Int. Cl.$^7$ ................................................ B28B 1/52
(52) U.S. Cl. .................. 264/628; 264/640; 264/641; 419/2
(58) Field of Search ................................ 264/640, 641, 264/628; 419/2

(56) References Cited

U.S. PATENT DOCUMENTS

| | | | |
|---|---|---|---|
| 4,143,118 A | * 3/1979 | Laing | 423/210 |
| 5,080,963 A | 1/1992 | Tatarchuk et al. | 428/225 |
| 5,096,663 A | 3/1992 | Tatarchuk | 419/11 |
| 5,102,745 A | 4/1992 | Tatarchuk et al. | 428/605 |
| 5,304,330 A | 4/1994 | Tatarchuk et al. | 264/104 |
| 5,310,593 A | * 5/1994 | Tsujimoto et al. | 428/166 |
| 5,372,178 A | * 12/1994 | Claar et al. | 164/98 |
| 5,441,681 A | * 8/1995 | Thomas | 264/87 |
| 5,630,974 A | * 5/1997 | Rose et al. | 264/105 |
| 5,912,201 A | * 6/1999 | Couture et al. | 501/95.1 |

FOREIGN PATENT DOCUMENTS

| | | |
|---|---|---|
| DE | 24 21 712 | 11/1975 |
| EP | 0 178 650 | 4/1986 |
| EP | 0 367 354 | 5/1990 |
| EP | 0 501 816 | 9/1992 |
| JP | 60 239374 | 11/1985 |
| JP | 63 050562 | 3/1988 |
| JP | 07097602 | 4/1995 |
| JP | 95-97602 | 4/1998 |

OTHER PUBLICATIONS

International Search Report PCT/US00/17160, Nov. 2, 2000.
Marrion, Christopher J., et al., "Composite fiber structures for catalysts and electrodes", *Journal of Power Sources*, 47 (1994) pp. 297–302.

* cited by examiner

*Primary Examiner*—Christopher A. Fiorilla
(74) *Attorney, Agent, or Firm*—Carella Byrne Bain Gilfillan; Elliott M. Olstein; William Squire (57) ABSTRACT

A shaped sintered fibrous porous body exhibits a structure with a three-dimensional corrugated or undulating shape and porosity. The structure includes inorganic fibers joined as a sintered structure and is produced in one embodiment by: dispersing and suspending a fiber mixture including inorganic fibers and organic binder, such as cellulose fibers, or other organic compounds, in a liquid to form a fibrous slurry; forming a body including the fiber mixture by depositing the slurry on a shaped screen to thereby shape the fibrous body to a three-dimensional configuration simultaneously with the formation of the body; removing at least a part of the liquid from the fibrous body through the screen by a vacuum; drying the fibrous body in the ambient atmosphere or in a furnace; heating the dried fibrous body to a first elevated temperature where the organic binder is removed from the body; subsequently heating the dried body to a second elevated temperature where the inorganic fibers are partly fused to form a sintered porous fibrous body with a three-dimensional corrugated or undulating configuration. The body is suitable for use as or included in reactor elements to provide gas/condensed phase mass transfer areas in a system involving processing or teatment of gases and/or vapors through distillation, absorption and/or catalytic reactions or the like requiring gas/condensed phase mass transfer, The body is also for enhancing fluid-catalyst mass transfer at low pressure drop and contacting between fluids or combinations thereof in single phase catalytic reactors.

18 Claims, 5 Drawing Sheets

METHOD FOR PRODUCING A SINTERED POROUS BODY

BACKGROUND OF THE INVENTION

The present invention relates to a method for producing a shaped sintered porous body exhibiting a large surface area to volume ratio, a three-dimensional complex shape and an open three-dimensional porosity with a large surface area to volume ratio. The invention further relates to bodies produced by the method and the use thereof, such bodies for use as reactor elements, e.g. reactors for the chemical and process industry.

By way of example, commercial distillation is normally practiced as a multistage, counter current gas and liquid operation in a tower containing devices such as packing to facilitate the gas-liquid contacting that is necessary for both mass and heat transfer. The sintered porous body of the present invention is, in one application, for use as such a packing device. The term mass transfer relates to the contact efficiency of one medium to another and specifically refers to material moving from one phase to another. In a distillation process for example no reaction may be ocurring, however, improved contacting of one fluid, e.g., a liquid with another fluid, a gas or liquid, or a gas with a gas or a liquid with liquid is desired in the distillation process.

Since multiple equilibrium stages exist in a distillation tower, the compositions of the vapor and the liquid change throughout the tower length. The desired products can be removed as either liquid or vapor at an optimum location in the tower. The more efficient he mass transfer, the shorter the tower or more energy efficient the tower to achieve the same number of equilibrium stages. Mass transfer devices of the prior art typically are separated trays which allow vapor to pass upwards through a small height of liquid or continuous packings which contain surfaces for gas-liquid contacting. The advantage of structured packings in distillation processses are high efficiency coupled with low vapor pressure drop. Low pressure drops are desired because of the increased cost to force gases upwardly in the tower to overcome high pressure differentials, if present, and also because high pressure differentials tend to result in column "flooding," where the liquid can no longer pass down the column.

Efficiency in a catalytic converter depends upon efficient contact of one fluid with another (gases or liquids in various combinations) or with a catalyst (a solid) and so on. Also, improved contact, i.e., mass transfer, is desired between fluids and/or fluids and solids since reaction rate depends upon th efficiency of th mass transfer with a solid catalyust. Thus improved contacting or mixing is desired to provide enhanced mass transfer or reaction rate in accordance with a given implementation. Sorption is thus desired in these processes whether adsorption or absorption.

Examples of catalytic distribution structures are disclosed in U.S. Pat. No. 4,731,229 to Sperandio, U.S. Pat. No. 5,523,062 to Hearn, U.S. Pat. No. 5,189,001 to Johnson, and U.S. Pat. No. 5,431,890 to Crossland et al.

Improved prior art packing structures have been developed comprising composite substrate structures, sometimes referred to as micromesh, which are porous products comprising a fibrous network of material. US Pat. Nos. 5,304,330; 5,080,962; 5,102,745 and 5,096,663, incorporated by reference herein, disclose the production of porous composite substrates comprising fibrous networks of material. A substrate mixture is comprised of typically metallic fibers for forming the porous composite and a structure forming agent which functions as a binder, which are dispersed in an appropriate liquid. After preforming, the liquid is removed and the composite heated to effect sintering of the fibers at junction points to produce a porous substrate composite comprised of a three-dimensional network of fibers. The structure forming agent is removed during or after sintering.

However, the porous material substrate in a packing structure of the type described above does not normally provide for fluid communication through the pores for the gases and liquids in the distillation process to provide for the needed desired contact while maintaining the desired low pressure drop. This is attributed to possibly capillary action due to the substrate material relatively small pore size. Such material may be for example 100 micron thick sheets (generally about 0.5–0.075 mm thick in one or more layers according to the desired strength) having the stiffness of conventional cardboard material, and sometimes referred to as a "paper," although comprising metal fibers and stronger than paper of cellulose fibers. Such material has a high surface to void volume, comprising approximately 90–98% voids.

One common design criteria for reactor elements is that they preferably offer a high surface area to volume ratio which in most cases is combined with a low pressure drop in the reactor. This is to optimize mass transfer. To increase this ratio, reactor elements are in the form of assemblies made from sheet material which have been press-formed into corrugations and so on and joined to form a system of larger internal passage-ways or channels. The sheets may be solid, with or without openings, i.e., perforations, or have an open mesh-like structure. Mesh-like metallic sheets with a woven cloth-like structure are used to provide catalytic surfaces. Reactor elements with a catalytic function typically comprise a catalytic material, which may be included as wire in the mesh but are typically applied as a coating or deposition on the mesh.

Before assembling the reactor elements in a reactor, the sheet material is often shaped by pressing to simple shapes like corrugated sheet and the like or punched to provide holes or openings. This shaping is a costly additional step and requires extreme care in handling delicate porous paperlike porous sheet material. The shaped sheets are subsequently assembled either in a framework or by joining using suitable methods such as soldering and/or spot-welding.

In accordance with the production of fibrous mesh in the latter above-noted US patents, a mixture is provided comprised of fibers for forming the porous composite body and a structure forming agent, in particular cellulose fiber, which function as a binder, which are dispersed in an appropriate liquid. After performing into a desired form, liquid is removed and the composite body is heated to a temperature to effect sintering of the fibers at junction points to produce a porous composite body comprised of a three-dimensional network of fibers. The structure forming agent is removed before or during the sintering process or may be removed after the sintering process.

Japanese Patent Publication JP-A-95/97 602 discloses sheets of the non-woven type comprising metallic fibers and formed with methods similar to conventional paper-making methods and subsequently subjected to heat for removal of paper fiber and formation of thermal bonds between the metallic fibers. The sheets are subsequently shaped or assembled to bodies suitable for use as reactor elements. These sheets are preferably coated with catalytic material.

Also this type of sheet material is shaped before assembly to reactors, using the same shaping, assembling and joining methods discussed above. These shaping processes typically are mechanical, employing dies and the like which are cumbersome and may be complex and costly to implement. The shaping of fibrous non-woven sheets is difficult as there is a need to avoid damaging the sheet material during formation. Such shaping at a minimum thus requires the sheet material to be formed and then later processed to produce the three-dimensional shape, such as corrugations and the like needed for the reactor processes.

However, with known bodies and methods for producing such bodies there are still restrictions in the freedom in design of bodies and in particular for use in reactor environments, and there is still a long felt need for an increase in surface area to volume ratio for many applications. There is also a need for new manufacturing methods for such reactor elements offering simple forming and shaping of the reactor elements and thereby offering cost reductions. This need is in particular long felt for reactors in the form of assemblies comprising a system of internal passage-ways including channels and walls. The need is for walls that exhibit an open porosity and, when appropriate, larger holes or perforations, which provide openings for fluid passage between the system of internal channels. Such shaping and assembling of the sheet material to assemblies with desired external and internal shapes in prior art systems is elaborate and costly.

In particular new methods are needed for manufacturing bodies with an open internal structure exhibiting internal passage-ways with a multiplicity of channels defined by internal walls having an open porosity and preferably holes or perforations providing openings between the channels. Also, known techniques offer no or limited possibilities to optimize both the size and shape of the pore structure in the internal walls of bodies and/or the larger passage-ways, i.e. the channels in the reactor elements to best meet the individual requirements of an installation. The need is also for introduction of catalytic material into the internal passage-ways by more efficient methods.

SUMMARY OF THE INVENTION

It is an object according to the present invention to provide methods for manufacturing a shaped sintered porous body for use, for example, as reactor elements.

A method for producing a shaped three-dimensional sintered porous body according to the present invention comprises the steps of:

dispersing and suspending a fiber mixture comprising inorganic fibers and a liquid containing an organic binder to form a fibrous slurry;

forming a wet fibrous body comprising the fiber mixture;

shaping the wet fibrous body to a three-dimensional configuration;

removing at least a portion of the liquid from the fibrous body;

drying the fibrous body;

heating in a first heating step the dried fibrous body to a first elevated temperature to remove the binder from the body;

subsequently heating the dried body after the first heating step to a second elevated temperature to fuse the inorganic fibers and, upon cooling, to form a sintered porous fibrous body with a three-dimensional configuration.

In one aspect, the fiber mixture is dispersed and suspended in water to form a water-based slurry and that the slurry is de-watered during or in connection with the forming and/or shaping of the fibrous body.

In a further aspect, the binder is selected from any one of the group consisting essentially of cellulose, organic resins including polyvinyl alcohol, polyurethanes, and styrenebutadiene latex, and thermosets, including epoxies, ureaform-aldehyde resins, melamine-formaldehyde resins, and polyamide-polyamine epichlorohydrin resins In a further aspect, the method includes forming the wet fibrous body into a sheet and then pressing the fibrous wet sheet into the three-dimensional configuration.

The forming and shaping preferably comprises a one-step molding operation.

The method in a further aspect may include the step of spraying the slurry onto a mold and simultaneously de-watering the sprayed mold to form a de-watered fibrous body. The forming the fibrous body in a further aspect comprises forming a mold comprising a molding surface with an open permeable structure and dipping the mold into the slurry, applying a suction to the mold such that the slurry is de-watered through the mold and forming the fibrous body on the mold.

The slurry in a further aspect is injected into a mold cavity exhibiting at least one molding surface with an open permeable structure, forming the fibrous body within the mold cavity and applying a suction to the mold cavity such that the slurry contained in the mold cavity is de-watered and the fibrous body is formed.

In a further aspect, the ratio of binder to inorganic fiber in the fiber mixture is controlled such that the shaped sintered body exhibits a predetermined porosity.

The sintered fibrous body in a still further aspect is coated with a catalyst in a subsequent step following the sintering.

The inorganic fibers are preferably selected from the group consisting essentially of metallic fibers, ceramic fibers, glass fiber, carbon fiber or any combination thereof.

The catalytic material in a further aspect is dispersed and suspended in the slurry.

The sintering heating step preferably includes heating the shaped body at a temperature below the melting point of the inorganic fibers but sufficiently high to achieve a partial fusion and a sintering of the contact surfaces between the fibers.

In a further aspect, a shaped, sintered, porous three-dimensional body is that produced according to the method.

The body in a further aspect exhibits a plurality of shaped porous sections having a broad surface and a thickness that is substantially thin relative to the broad surface.

The body shaped thin-walled porous sections exhibit a porosity preferably exceeding about 50 percent by volume and more preferably exceeding about 90 percent by volume.

The body may be coated with catalytic material.

The inorganic fibers are preferably selected from the group consisting essentially of one or more of metallic fibers, ceramic fibers, carbon fiber, glass fiber and/or combinations thereof.

The body is preferably arranged in one aspect as a reactor element to provide gas/condensed phase mass transfer areas in a system comprising any one of the group of processes consisting essentially of processing or treatment of gases and/or vapors through distillation, absorption and catalytic reactions requiring gas/condensed phase mass transfer.

The body in a further aspect is arranged as a reactor element to provide fluid-solid mass transfer, or to promote fluid-fluid mass transfer, or combinations thereof in a system comprising any one of the group of processes consisting essentially of processing fluids through ab- and ad-sorption and catalytic reactions.

In a still further aspect, the method for producing a shaped three-dimensional sintered porous body comprises the steps of:

forming a fibrous body of a wet fiber mixture comprising inorganic fibers and a liquid containing an organic binder in a three-dimensional configuration;

subsequently drying the body; and then heating the body to remove the organic binder and to sinter the inorganic fibers to form a three-dimensional shaped body comprising a porous network of interconnected inorganic fibers.

The method preferably includes in a further aspect shaping the body while wet during the forming the fibrous wet body in a single step into a three-dimensional shaped sheet member.

The method in a further aspect includes forming apertures and fins on the body during the forming.

The method preferably including drying the body after the forming, the heating including a first heating step at a first temperature to remove the inorganic binder and then heating the body at a second elevated temperature to partly fuse the inorganic fibers to form a sintered porous fibrous body with the three-dimensional shape.

The method may include storing the dried body, soaking the body after storing to form a wet body and then shaping the wet body prior to the heating.

The method according to the present invention offers capabilities for a cost-effective processing, but more important, a high degree in flexibility in design and dimensioning of the passage-ways, including the larger channels and the open porosity and in the choice of both functional and structural materials to be included in the shaped, sintered, porous, fibrous bodies. Thus, as an extra advantage, the present invention provides an increase in the performance limitations of the bodies, e.g. temperature range, compositions of the gases or vapors to be processed. Thereby the bodies produced by the methods of the present invention are useful for new applications.

The bodies when intended for use in a reactor, such as a catalytic reactor, can be employed for a wide variety of chemical reactions. As representative examples of such chemical reactions, there may be mentioned hydrogenation reactions, oxidations, dehydrogenation reactions, alkylation reactions, hydrotreating, condensation reactions, hydrocracking, etherification reactions, isomerization reactions, selective catalytic reductions, and catalytic removal of volatile organic compounds.

The above figures and the embodiments exemplified by them serve only as examples and shall be construed only as examples and not as limitations to the scope of the present invention, the same is applicable for examples given of suitable parameters and material selections in this application.

The method according to the present invention will also be further illustrated in some examples given in the following description.

DESCRIPTION OF THE PREFERRED EMBODIMENTS

Figure 1:
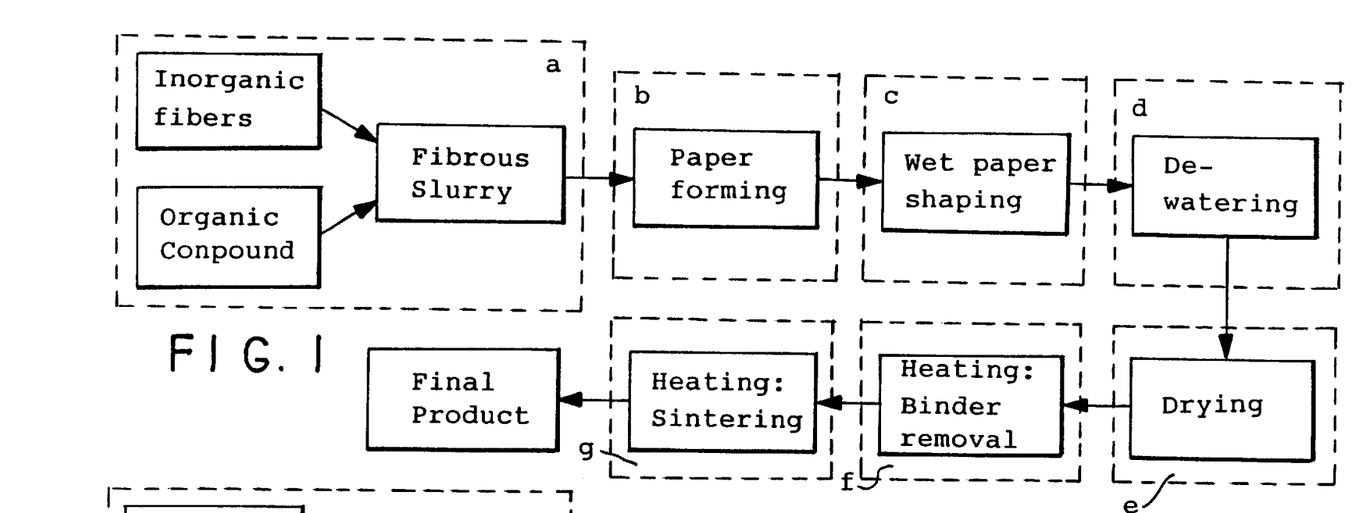
FIG. 1 is a schematic diagram of an embodiment of a method according to one aspect of the present invention for forming a three-dimensional shaped sheet material product.

A process according to one embodiment of the present invention, FIG. 1, for producing a shaped sintered porous body comprising a three-dimensional material structure and a shape having a three-dimensional configuration, such as undulations or corrugations and so on includes the steps of:

a) dispersing and suspending a fiber mixture comprising inorganic fibers and a structure forming agent which is an organic compound, for example, cellulose fibers, in a liquid to form a fibrous slurry;

b) forming a body comprising the fiber mixture;

c) shaping the fibrous body, while wet, to a three-dimensional configuration;

d) removing at least a part of the liquid from the fibrous body by physical means, for example, with a vacuum, preferably during or in connection with the forming step;

e) drying the fibrous body;

f) heating the dried fibrous body to a first elevated temperature where the structure forming agent, the organic material, e.g., the cellulose fibers, are removed from the body;

g) subsequently heating the dried body to a second elevated temperature where the inorganic fibers are partly fused to form a sintered porous fibrous body with a three-dimensional porosity and shape having a three-dimensional configuration upon cooling.

The term cellulose fibers means in this application fibers made of cellulose or a cellulose derivative. It is not required that all steps a to g are carried out in this sequence and in other embodiments of the present invention two or more of these steps are performed simultaneously in a combined operation or separately as shown in the several figures. The fiber mixture structure forming agent is preferably dispersed and suspended in water such that a water-based slurry is formed and that the fibrous body is formed by dewatering the slurry, as by a vacuum, for example.

For simplicity, the description and examples of this application will concentrate on the use of water-based slurries. The scope of the invention shall however not be limited to the use of water-based slurries. Even if water normally is a quite suitable liquid, alcohol, water-alcohol mixtures or water-glycol mixtures may be used depending upon the compound employed. However, the methods according to the present invention are applicable to the use of any arbitrary liquid deemed suitable for dispersion and suspension of the specific materials to be comprised in the produced body as e.g. some materials might be oxidized or otherwise react in an undesired way upon contact with water which can be avoided by using another liquid, e.g. an alcohol, such as methanol, ethanol, propanol and so on.

The methods according to the present invention might also use any chemicals or other products commercially known to enhance the dispersion and suspension of fibers both organic fibers and inorganic fibers to provide a well-dispersed stable suspension or slurry. The methods according to the present invention might also use any chemicals or other products arbitrary known in the trade to enhance the wet strength of the wet preforms and thus the handleability and stability of these preforms during processing.

Figure 6:
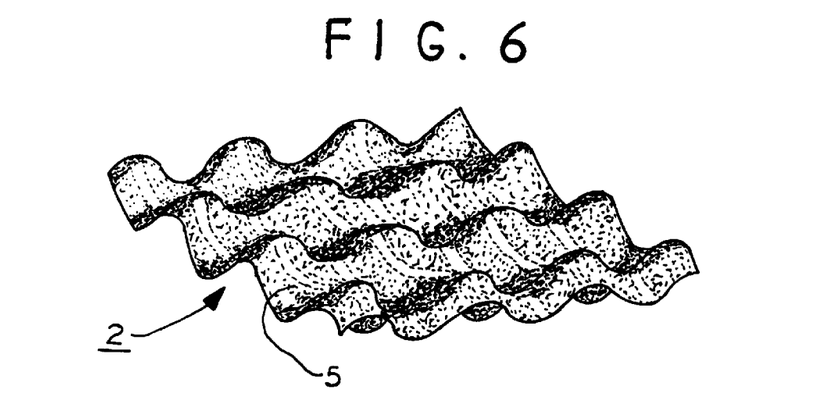
FIG. 6 is a schematic isometric view of a product made with the screen of FIG. 5.

The shaped, sintered fibrous, porous body 2, FIG. 6, produced by the methods according to the present invention preferably comprises thin-walled porous sections and is shaped to a configuration comprising corrugations, or undulations such as undulations 5, FIG. 6, and so on, such as in an egg tray, whereas the body or an assembly of such bodies in overlying relation defines a plurality of larger passageways through the body/assembly of bodies. For example, in overlying bodies, the adjacent bodies define channels or passage ways therebetween. Therefore, the body in addition to the open porosity of the sheet material forming the body may be formed with larger openings or holes to effect communication of fluids through the body with adjacent bodies and with opposite sides of the body, and/or with shaped wall sections as shown and described later in connection with the embodiment of FIG. 9.

The shaped wall sections may be configured as channels, grooves, pits, indentations, projections, bridges and so on such that they together with any openings or holes in the material define, in the body or in an assembly of bodies, a system of channels. Such a system of channels in combination with the open porosity of the thin-walled sections provides a body exhibiting a large surface area to volume ratio in combination with a low resistance to any gas or liquid flowing along or through the body.

Thus a shaped sintered porous body suitable for use as reactor elements is obtained, providing gas/liquid mass transfer surfaces in an installation for processing of gas/vapor, which in most cases preferably meet the double objective of a large gas/liquid mass transfer area combined with a desired low pressure drop over the reactor elements for the gas/vapor to be processed. These reactor elements can also be used to enhance fluid-catalyst mass transfer at low pressure drop in single phase catalytic reactors or to enhance contacting between fluids in single-phase (catalytic) reactors. Efficient mass transfer is desirable in all cases whether single or multiple phase systems. The reactor elements when employed in a reactor can be self-supporting and load-carrying as such, but they can also be mounted in a supporting structure, such as a cage or the like.

Figure 2:
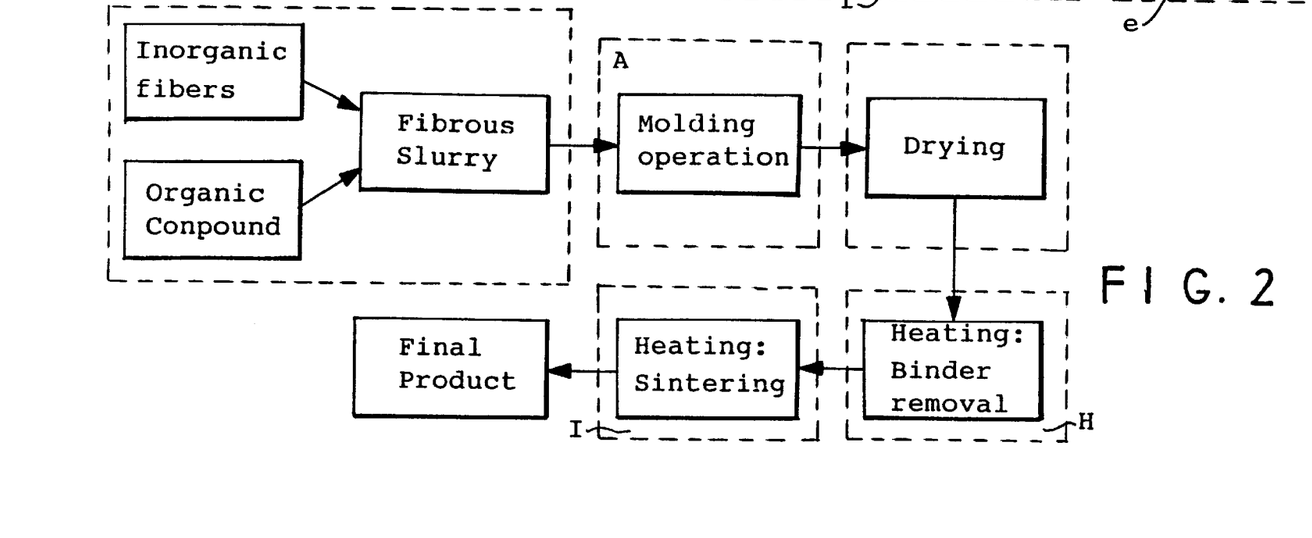
FIG. 2 is a schematic diagram of a further embodiment of a method according to the present invention for forming a three-dimensional shaped sheet material product wherein the forming, shaping and de-watering steps are simultaneously performed during a one-step molding operation.
Figure 3:
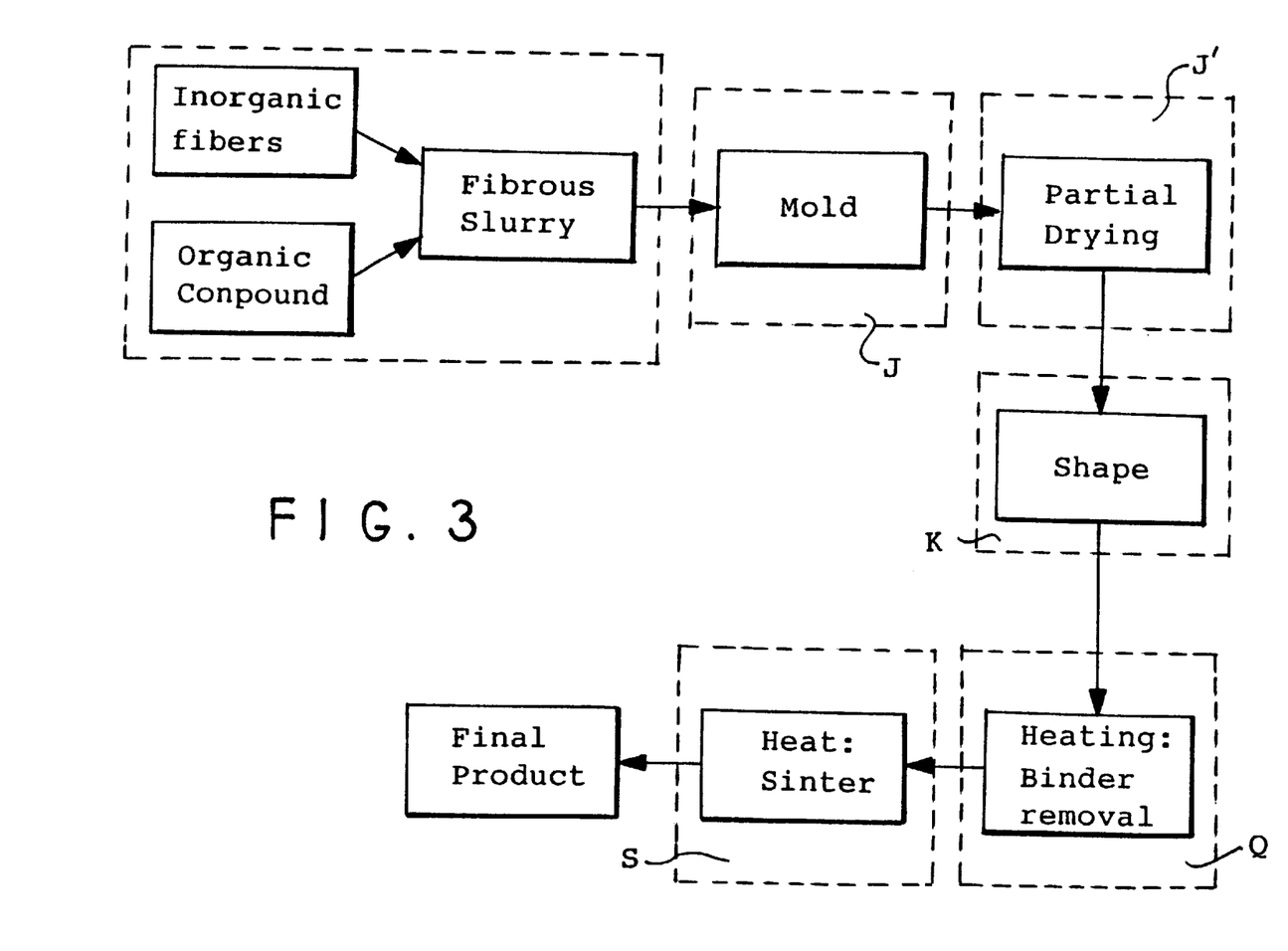
FIG. 3 is a schematic diagram of a third embodiment of the present invention wherein a sheet of fibrous material is formed by molding and then die shaped prior to final processing forming the final product.
Figure 4:
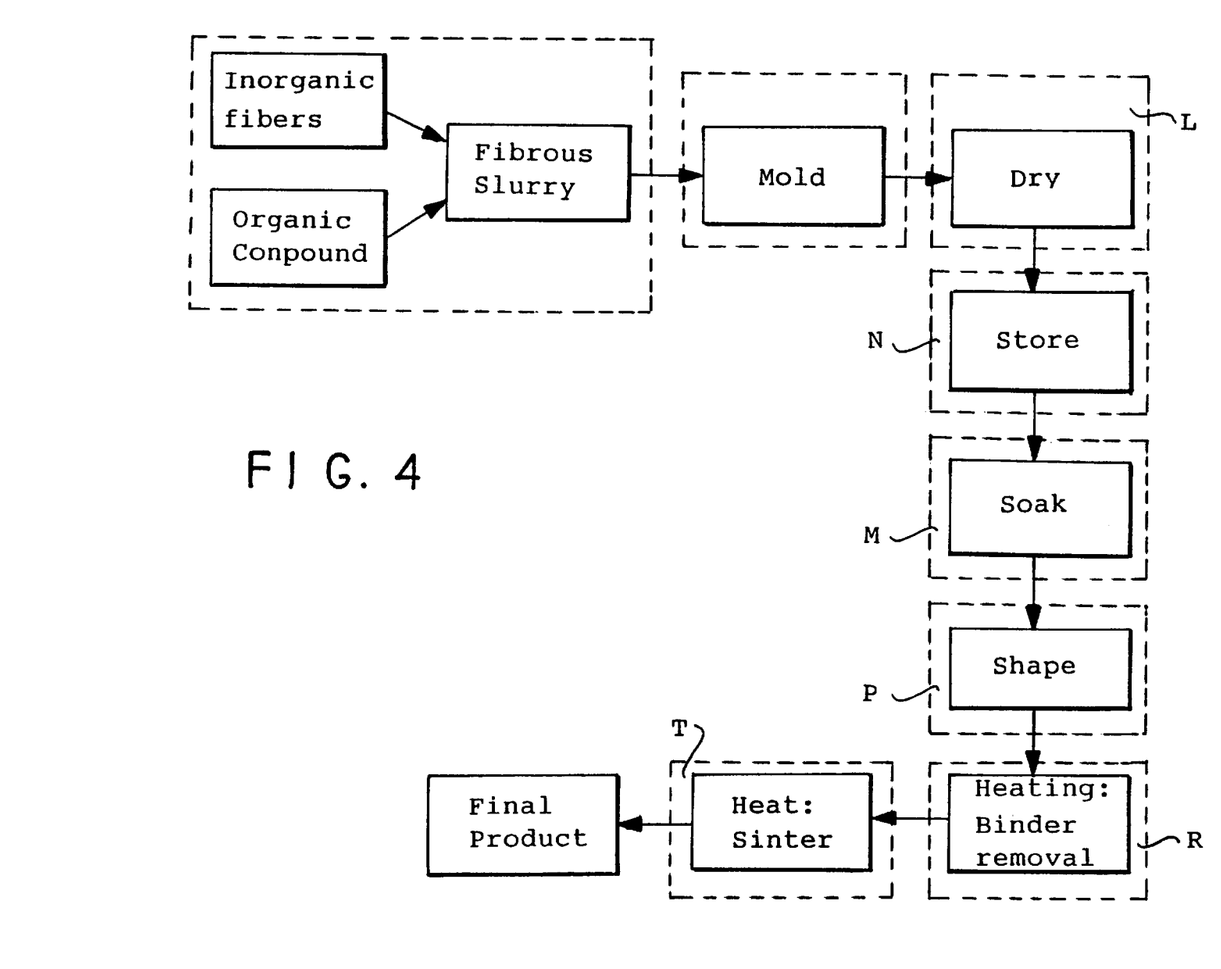
FIG. 4 is a schematic diagram of a further embodiment of the present invention wherein a sheet of fibrous material is formed by molding, stored and later soaked in water and then die shaped prior to final processing forming the final product.

Preferably, the fibrous body, prior to drying, includes a structure forming agent, an organic binder compound, which may be fibrous cellulose, removed by heating, step f, FIG. 1, step H, FIG. 2, step Q FIG. 3 or step R, FIG. 4, and the inorganic fibers, such as metals or ceramics, sintered and shaped to a configuration exhibiting a three-dimensional configuration in a further heating step, step g, FIG. 1, step I, FIG. 2, step S, FIG. 3 or step T, FIG. 4. This can be done either by first forming a sheet-like body, step J, FIG. 3, which in a subsequent step, step K, is shaped after the body is dry, in a suitable way by any arbitrary technique for shaping such as pressing with a shaped die, bending, roll forming and so on. The sheet can be dried, step J', FIG. 3 or step L, FIG. 4, and stored, step N, FIG. 4, before shaping, step P, but is preferably always according to the present invention shaped while wet. That is, a dried stored sheet, such as a sheet taken from a paper forming process comprising the fiber mixture and made on a conventional paper machine is soaked before being shaped, step c, FIG. 1 or step M, FIG. 4, for example. In FIG. 3, the shaping may be formed while the sheet is dry but is not the preferred implementation.

Figure 5:
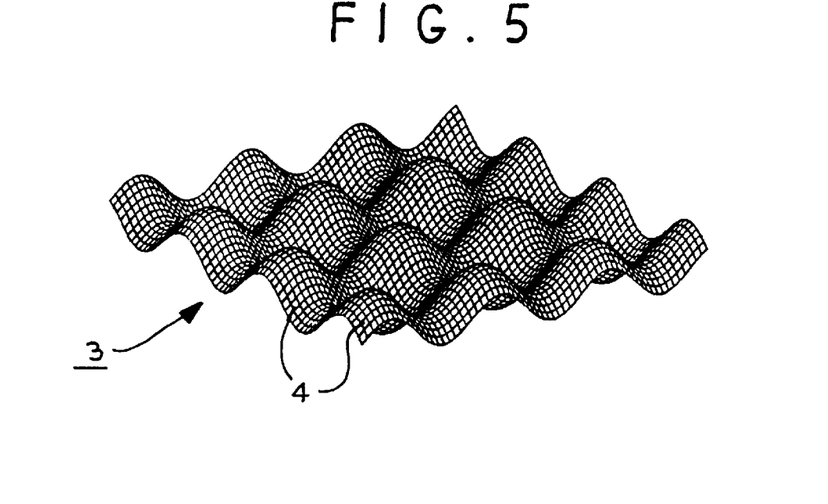
FIG. 5 is a schematic isometric view of a screen mold which may be used in the processes of the present invention.

However, according to one embodiment illustrated in FIG. 2, the body is formed and shaped to the desired configuration in a one-step molding operation, step A, including the forming, shaping and de-watering of a fibrous body using a shaped mold such as a preferably metal mold, screen 3, FIG. 5. This one-step molding can be carried out in a number of alternative ways which will be described more in detail below. The shaped mold typically comprises the shaped screen 3, FIG. 5, with a large plurality of openings 4 formed by such a screen. Water is extracted through the screen 3 from the slurry 6, FIG. 8, with a vacuum, e.g., provided by apparatus 8. The fibrous body 10, FIG. 9, is thus formed on the screen 3. The screen 3 exhibits the mesh-like woven structure of a wire gauze or cloth backed by a structure with openings and channels connected to a vacuum apparatus 8 and vacuum source (not shown) for applying a suction, e.g. a pump. The slurry 6 is in a tank 9, FIG. 8, in this embodiment.

Figure 8:
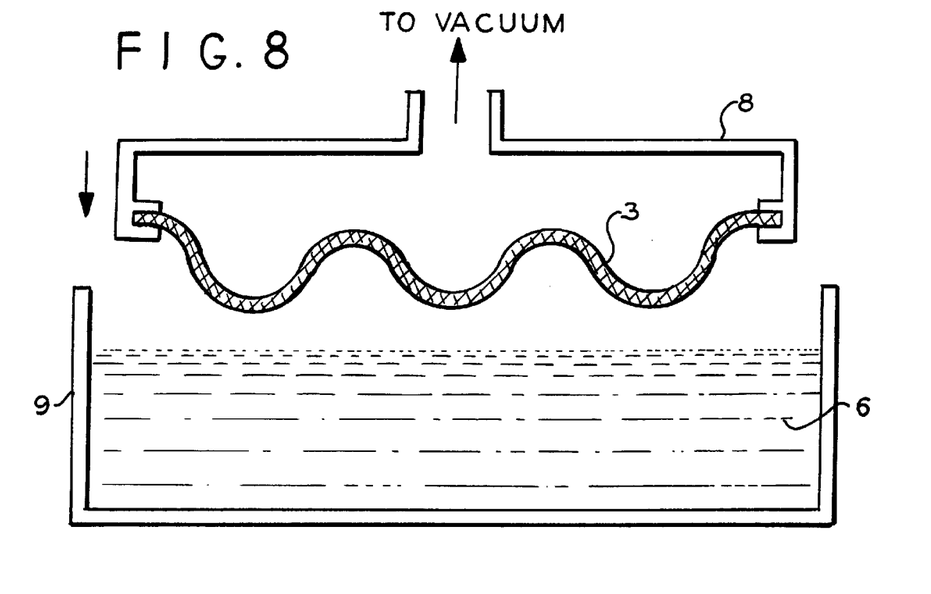
FIG. 8 is a schematic diagrammatic sectional side elevation view of an apparatus employed in the molding step of FIG. 2.
Figure 9:
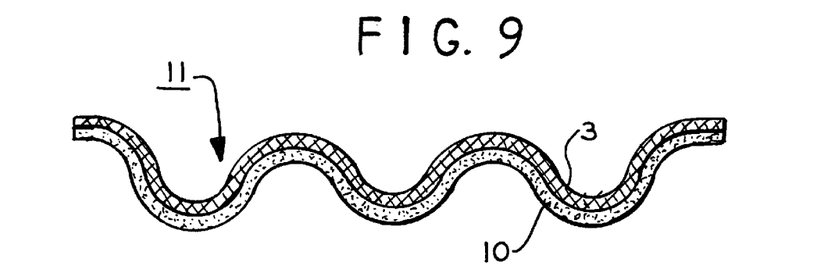
FIG. 9 is a fragmented sectional side elevation view of an intermediate stage of a product formed by a screen such as the screen in FIG. 5 in the molding operation of FIG. 2.

The slurry can be applied to the shaped mold such as screen 3 in a number of alternative ways, such as:
  sprayed onto the mold screen 3 while being removed from the fiber mixture slurry 6 during or in connection with spray-forming (not shown);
  dipping and at least partly sub-merging the shaped mold into the slurry as in FIG. 8 while de-watering the slurry close to the screen 3 by the vacuum such that a de-watered fibrous, shaped body is formed on the screen 3 in the mold as depicted in FIG. 9; or
  injecting the slurry into a shaped mold cavity exhibiting one or more surfaces covered by a screen and de-watering the slurry injected into the tool through the screen (not shown).

Spray-forming may comprise some de-watering already intrinsically achieved by the spraying itself but this may be, when appropriate, combined with de-watering through a screen in the shaped mold by a suction as shown in FIG. 8, for example. The dip forming technique of FIG. 8 offers the advantage of controlling wall thickness, e.g., preferably 10–100 mm, and more preferably less than 50 mm, by variations of suction power and forming time, i.e., the time of the mold immersion in the slurry. The injection molding techniques might require the use of multi-injection with intermediate de-watering, e.g. accomplished by a tool or mold comprising a blow-back system (not shown), to ensure that the desired body is formed in the tool and that no undesired cavities are present in the formed body.

Figure 7:
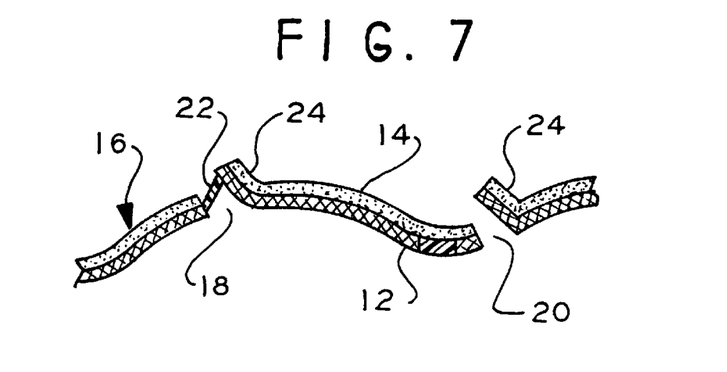
FIG. 7 is a fragmented sectional side elevation view of a further embodiment of a screen employed in the process of FIG. 2 to produce an apertured sheet material product with vortex generator tabs useful in a reactor process.

All of the above described techniques can also be used to form the porous fibrous body 10, FIG. 8, on a metal mesh preform, e.g., screen 3, FIGS. 5 and 8, formed as a self supporting structure. Such a mesh preform screen 3 is introduced into the molding apparatus being used, such as tank 9 and slurry 6, FIG. 8. The slurry 6 is deposited on the mesh preform screen 3 which can exhibit a very complicated shape and openings, e.g. punched holes, as shown by mesh preform screen 12, FIG. 7. In FIG. 7, a preform assembly 16 comprises a metal screen mesh 12 and a fibrous member body 14. The holes 18, 20 in the screen 12 are blocked with removable plugs 22 (one being shown). Also a vortex generator fins or tabs 24, for use in generating turbulence in a reactor gas flow, are also formed in the screen 12. The tabs 24 are arranged in accordance with a given reactor configuration and gas flow requirements. Hole 20 is shown with the plug removed. Vortex generator fin or tab 24 is adjacent to the hole 20. The screen 12 is formed with such holes and tabs to form the holes and tabs in the fibrous body 14. Holes may be formed without tabs if desired according to a given implementation.

Figure 10:
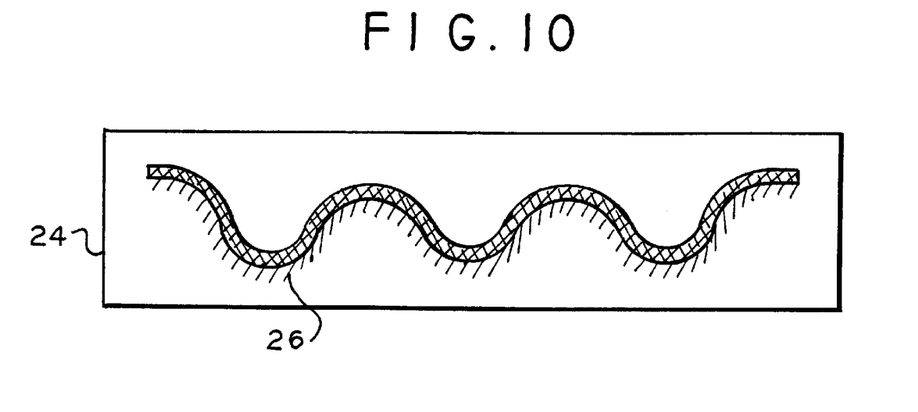
FIG. 10 is a schematic diagrammatic side elevation sectional view of a furnace employed in the heating portion of the method of the present invention.

The mesh preform screen 12 with the deposited fibrous layer body 14, FIG. 7 or screen 3 and body 10, FIG. 9, is transferred to a furnace 24, FIG. 10, where the body 12 is dried and heat treated to form a shaped porous, fibrous and reinforced body fulfilling the objectives of the present invention. The symbols 26 in FIG. 10 represent a temporary support structure such as the mesh or screen 3, FIG. 9, or screen 12, FIG. 7, or other support structure (not shown). The screen or support structure is later removed from the formed body 10, FIG. 9, o r body 14, FIG. 7.

The processing can also include a paper forming process, step b, FIG. 1, comprising the fiber mixture on a conventional continuous paper forming machine (not shown). Sheets of suitable size and shape are then cut from the roll and soaked, step b, FIG. 1, with or without storing the sheets, such as in steps M and N, FIG. 4, before being formed in any suitable arbitrary way, e.g. press-formed using a shaped die or roll-formed, step c FIG. 1 or step P, FIG. 4. The shaped product is thereafter dried, step e, FIG. 1, and heat treated, steps f and g, FIG. 1, according to the general concept of the present invention.

To control the porosity of the shaped, sintered fibrous, porous body produced by the methods according to the present invention, the ratio of cellulose fiber or other organic binder compound structure forming agent employed to form the body to inorganic fiber in the fiber mixture is controlled such that the produced shaped sintered body exhibits the desired porosity. The porosity of the final body preferably exceeds 50 percent by volume and more preferably exceeds 75 percent by volume. In many applications, the preferred porosity of the porous body, i.e. the porosity of the thin-walled porous and fibrous sections of the shaped body, exceeds 90 percent by volume and more preferably may be 95% by volume. The formed body is measured in centimeters in width and length as compared to the mm thickness of the sheet material.

The formed fibrous wet fibrous body or preform assembly 11, FIG. 9, for example, is typically dried at temperature between 100 and 200° C., step e, FIG. 1, step A', FIG. 2, step J', FIG. 3 or step L, FIG. 4, and subsequently heated to a first elevated temperature between 350 and 500° C., step f, FIG. 1, step H, FIG. 2, step Q, FIG. 3, or step R, FIG. 4, for removal of the structure forming agent such as cellulose fibers or other organic compounds, as applicable, used in the binder slurry and any other organic matter present in the dried preform, typically in a steam atmosphere. The fibrous body or preform assembly is subsequently sintered at a second elevated temperature below the melting point of the inorganic fiber used, for example, step g, FIG. 1, step I, FIG. 2, but sufficiently high to achieve at least a partial fusion in the contact surfaces and thus sinter the inorganic fibers together to form a structurally self-supporting body with a high porosity and a three-dimensional configuration. The sintering temperatures will thus range from 500° C. for low melting metallic fibers such as aluminum, around 900° C. to 1300° C. for steel, and up to around 1800° C. or higher for more refractory ceramic fibers such as high aluminum or zirconium.

The final product when intended for use in catalytic reactions also comprises catalytic material which may be applied to or introduced into the shaped, porous, fibrous, sintered body in alternative ways and in different forms. The shaped, sintered body is coated with a catalytic material in a subsequent step following sintering in one embodiment or, in a different embodiment, the shaped dried body is coated with a catalytic material in an intermediate step following the removal of cellulose fibers or the other organic compound, as applicable, in the binder, but before sintering. The coating is applied to essentially the total area of the surfaces including also the internal surfaces in the pore system or to only part of the surfaces. Alternatively, the catalytic material is introduced into the slurry and thus incorporated into the sintered structure. Catalytic material (not shown), in powdered or fibrous form, is thus preferably introduced into the slurry 6, FIG. 8, where it is dispersed and suspended. The powdered and/or fibrous catalytic material may be powder or fibers consisting essentially of the catalytic material or be a powder or fiber material comprising a coating of the catalytic material.

Suitable inorganic fiber material for production of a shaped, porous body with the method according to the present invention comprises one or more of the following fibers or any combination thereof:

metallic fibers, preferably of metal or a metal alloy based on one or more of the following metals: aluminum, copper, iron, nickel, cobalt or the like;

ceramic fibers, preferably in the form of oxides, silicates including glass fiber, carbides, nitrides and carbon fiber; and coated fibers, preferably metal coated ceramic fibers and especially ceramic or metallic fibers coated with a catalytic material such as platinum, palladium or alloys comprising these metals or the like.

Illustrative but not exhaustive examples of metal fibers which may be used in the practice of the present invention include aluminum, titanium, vanadium, chromium, iron, cobalt, zinc, nickel, copper, zirconium, niobium, molybdenum, r;uthenium, rhodium, palladium, silver, cadmium, indium, tin, hafnium, tantalum, tungsten, rhenium, osmium, platinum, gold, antimony, beryllilum, iridium, silicon, magnesium, manganese, gallium, and combinations of the above. Metal alloys may also be used as exemplified by constantin, hastelloy, nichrome, inconel, monel, carpenters metal, and various steels, especially stainless steels, and other alloys. There is a large flexibility in the choice of metal fibers. Carbon fibers may also be employed.

The diameter of the fibers may vary over a wide range. The fiber diameter may vary from about 0.5 microns to 25 microns or greater. The selection of a specific diameter is within the scope of one of ordinary skill in this art.

In producing the composite, the dispersion which includes the fibers and the structure forming agent may further include particles which are to be entrapped in the interstices of the mesh-like structure of the composite. In a preferred embodiment, such particles may be a catalyst, a catalyst support, a catalyst precursor, or a supported catalyst or a supported catalyst precursor. When such particles are included in the dispersion, such particles become entrapped in the interstices of the mesh.

The fibers and other components, if any, are dispersed in a liquid by any suitable means. It is not essential to have a uniform dispersion, although often such uniformity is desirable. Dispersion may be effected by such means as sonication, agitation, ball milling and so on. The purpose of the liquid is merely to facilitate effective dispersion of the solids, especially where a uniform dispersion is desired in the final preform.

Normally the liquid used will be unreactive with the other components of the dispersion, but special cases may arise where a functionally desirable reactive property or the medium may be advantageously combined with its fluidity. Since the liquid is later removed, it is clear that it should be readily removable, as by volatilization. Water is normally a suitable liquid, although water-alcohol mixtures, and especially water-glycol mixtures, may be used. Illustrative examples of other liquids include methanol, ethanol, propanol, ethylene glycol, propylene glycol, butylene glycol, polyethylene glycol(s), polypropylene glycol(s) and so on. Other organic liquids may be used but normally without any advantages.

The liquid medium may contain salts where these are desirable, and the greater solubility of salts in water relative to organic media also make the use of water highly advantageous. While some mixtures of the above-noted liquids are used to adjust the viscosity of the dispersion so that filtering or settling onto a screen or filter provides a certain degree of uniformity within the "wet" preform regardless of the densities and drag forces acting on the various particulates, still other additives including surfactants and dispersing agents can be used to assist in the mixing process and to preferentially associate at least two of the solids with one another in the preform. The liquid medium may also contain ordinary paper making addditives, such as deflocculation and dispersion agents.

The structure forming agents, i.e., the organic binder compounds, which are employed are chosen so that they can be volatized or gasified, with such structure forming agent preferably being capable of being gasified to at least 90% and more preferably to at least 95% and still more preferably to at least 99%, all by weight.

Among the structure forming agents which may be used in the practice of the present invention are cellulose, organic resins such as polyvinyl alcohol, polyurethanes, and styrenebutadiene latex, and thermosets, such as epoxies, ureaformaldehyde resins, melamine-formaldehyde resins, and polyamide-polyamine epichlorohydrin resins. Cellulose, in all its forms and modifications, is a desirable structure forming agent because it volatilizes completely at relatively low temperatures with little ash formation and is unreactive toward other components in the preform.

The structure forming agent is present in the preform fibrous body at a range from about 2 to about 90 weight per cent. The minimum amount of structure forming agent is that which is necessary to give a stable fibrous preform body, that is, one which can be handled, shaped and so forth, which amount depends upon fiber loading, fiber size, and so on. The amount of structure forming agent present in the fibrous body will influence the void volume of the final composite product, with a higher structure forming agent content affording a higher void volume. Hence, the structure forming agent can be used as one independent variable to control this property. Where two metal fibers are used with different fiber sizes, the amount of the smaller sized fiber also may be used to vary void volume and pore size. A range from about 25 to about 60 weight percent of cellulose in the preform fibrous body is preferred. The heat removal of the structure forming agent organic compound is performed by gasifying the compound.

The gasification, prior to sintering, is effected to gasify at least 50% of the structure forming agent or binder, preferably at least 70% and more preferably at least 90%. More preferably, at least 95 to 99% or better of the binder is gasified prior to sintering. The heating of the binder is below the sintering temperature. The temperatures employed depends upon the binder, the sintering temperature of the fibrous network, and the amount of binder which is to be removed.

The gasification may be performed in a wide variety of atmospheres and with or without a catalyst, and with pretreatment steps, if desired. The gasification may be effected in an inert atmosphere in the presence or absence of steam with or without a catalyst, or in the presence of oxygen or oxygen in an essentially inert gas with or without the presence of a catalyst, or in the presence of hydrogen with or without a catalyst or in the presence of a combination of hydrogen and steam with or without catalyst or in the presence of steam with and without a catalyst in any number or sequence of pretreatment steps.

In case the gasification below the sintering temperatures does not remove essentially all of the binder, the remainder of the binder may be gasified at the sintering temperature. The choice of sintering temperature or temperatures depends on the metal or alloy used, metal fiber diameter, sintering time, and the desired physical properties in the final metal fiber mat structure, or that of the composite structure consisting of other fibers or inorganic particles.

If a catalyst is used, the catalyst is one which permits the inorganic binder, the structure forming agent, to be gasified at temperatures lower than the temperatures at which the fibers forming the composite will be sintered. The catalysts for permitting gasification of the cellulose material at temperatures below the sintering temperatures may one or more of the following oxide or metal catalysts or combinations thereof. As an example, oxide catalysts may be potassium hydroxide, vanadium oxide, calcium hydroxide, rhenium oxide, ruthenium oxide. Metal catalysts can be one or more of the following catalysts: platinum, palladium, ruthenium, rhodium, nickel and so on.

Where steam is used, steam may be added or the steam can be generated in situ from, for example, residual water present in the composite or by "wetting" the composite. In general, the steam is added in an amount of from 0.05 to 97 volume percent.

The binder may also be gasified by the generation of free radicals such as the use of plasma to generate such radicals. The preferred binder is cellulose or a cellulose derivative.

In the case where the preform includes a metal which can be oxidized and the oxidization is not easily reversed, the gasification is preferably accomplished in a reducing atmosphere.

According to one preferred embodiment, the shaped body is sintered at a temperature below the melting point of the fibers but sufficiently high to achieve a partial fusion of the fibers in contact at surfaces between the fibers and thus a sintering of the fibrous shaped body. Typically the shaped body will require a support from the shaping stage and through to cooling after the sintering step. Such support is preferably made of a refractory material with a low tendency to react with the materials present in the fibrous body. Suitable support materials are commonly used as kiln furniture at the temperatures employed for sintering in the method according to the present invention. In the low temperature range, i.e. for fibrous bodies requiring a sintering temperature below 1100–1200° C., silicate bodies, even foamed silicate bodies, or fiber based low thermal mass bodies can be used. At higher temperatures, e.g. temperatures exceeding 1500° C., supports made from silicon nitride, aluminum, zirconium, boron nitride or graphite might be considered. If deemed appropriate foamed or fibrous low thermal mass supports comprising these high temperatures material can be used. In some case these supports needs to be coated to avoid reactions with the fibrous body to be produced and/or the furnace atmosphere. The furnace atmosphere needs to be adjusted to avoid unwanted reactions such as oxidation and the like of the fibrous body to be produced.

A shaped fibrous body produced according to the method of the present invention comprises inorganic fibers, i.e. metallic fibers, ceramic fibers or a mixture thereof, joined to form a sintered structure, which exhibits a three-dimensional porosity and a shape having a three-dimensional configuration. The sintered structure is typically non-woven and essentially self-supporting. It exhibits thin-walled porous sections configured to a three-dimensional shape exhibiting grooves, pits, indentations, projections, bridges etc. such that they together with any openings in the thin-walled sections define, in the body or in an assembly of bodies, a system of channels. Such a system of channels, in combination with the open porosity of the thin-walled sections, provide a body exhibiting a large surface area to volume ratio. The porosity of the final body preferably exceeds 50 percent by volume, more preferably exceeds 75 percent by volume and even more preferably exceeds 90 percent by volume. The thickness of the thin-walled sections is in the millimeter range, i.e. from 0.05 mm to 30 mm, generally from 0.1 mm to 10 mm, and preferably from 0.3 to 5 mm. The final product when intended for use in catalytic reactions comprises catalytic material either as a coating applied on at least part of the total surface of the fibrous body including parts of the internal surfaces exposed in the open porosity. Alternatively fibers and/or particles of catalytic material are comprised in the fibrous structure. As a result, enhanced mass transfer is provided by the formed porous body produced according to the present invention. Single or multiple phase fluid systems are thus enhanced in mass transfer characteristics with a body fabricated according to the inventive process. The body so produced is preferably arranged as a reactor element to enhance gas to solid, gas to liquid, gas to gas or fluid (gas or liquid) to solid mass transfer and to provide a catalytic source for treating the gas or liquid. The body 2, FIG. 6, or body 14, FIG. 7, for example, with a catalyst included, forms a reactor element which promotes mass transfer in an ab- or ad-sorption and catalytic reaction processes. Without a catalyst present, the body in combination with similarly shaped bodies may form a packing device in a distillation process wherein the bodies are shaped to form fluid channels or passageways in a known manner.

The method according to the present invention is further illustrated and exemplified by the following examples which are included and shall be construed only as examples and not as limitations to the scope of the present invention.

EXAMPLES

Example 1

A fiber mixture comprising 50% by weight of stainless steel fiber, having a diameter of 8 $\mu$m and a length of 3 mm and 50% by weight of bleached cellulose fiber was dispersed and suspended in water to form a slurry with a solids content below 10% by weight. A mold comprising a shaped molding surface in the form of a screen was submerged in the slurry which was kept under agitation until forming. During forming a suction was applied to the mold such that fibers were vacuum-attracted to the shaped screen and a thin shaped layer was deposited on the shaped screen. The shaped wet fiber product was dried at a temperature of 180° C. and exhibited a thickness of 500 $\mu$m after drying. The product was subsequently subjected to a temperature of 500° C. in steam atmosphere for removal of the cellulose fibers and any other organic matter. The metal fiber product was finally sintered at 1000° C. in vacuum after which the shaped porous product preform was pressed to obtain a porosity of 92% by volume.

Example 2

A fiber mixture as in Example 1 was prepared and dispersed in water to form a slurry as described in Example 1. A mold comprising an essentially flat molding surface was submerged in the slurry. A suction was applied to the mold such that fibers were vacuum-attracted to a screen and a thin sheet layer was deposited on the screen. The fibrous wet sheet was shaped to an egg tray shape using a press with a shaped die. The shaped wet fiber product was dried at a temperature of 180° C. and exhibited a thickness of 700 $\mu$m after drying. The thin sheet was subsequently heat treated at two elevated temperatures as described in Example 1. The final product having the shape of an egg tray exhibited a porosity of 90% by volume.

Example 3

A thin sheet was produced as in Example 2 but was dried without shaping and stored for a period of some weeks. It was thereafter taken out and soaked in water. After being completely soaked it was shaped and further processed as in Example 2 resulting in a product having the same features as the product in Example 2.

Example 4

A fiber mixture as in Example 1 was prepared and dispersed in water and introduced in a conventional papermaking machine where a 700 $\mu$m thick dry paper comprising the steel fibers was produced. Sheet were cut from the paper and soaked in water. After being completely soaked it was shaped and further processed as in Example 2 resulting in a product having the same features as the product in Example 2.

Example 5

A fiber mixture as in Example 1 was prepared and dispersed in water to form a slurry as described in Example 1. A shaped insert made from light gauge stainless steel mesh cloth was arranged as molding surface within the mold. The mesh also includes a plurality of punch ed holes with a diameter of 2 mm. The stainless wire had a diameter of 0.2 mm and the mesh openings were 1.45 mm, i.e. less then half the length of the dispersed steel fibers. The steel mesh exhibited a void volume in excess of 90%, i.e. in the same range as the product to be produced. The mold comprising the shaped insert was submerged in the slurry. A suction was applied to the mold such that fibers were vacuum-attracted to the inserted stainless steel mesh and a thin layer was deposited on the mesh. The fibrous wet product comprising the mesh as a reinforcing backing structure was taken out of the mold and transferred to a furnace where it was dried, exhibiting a deposited layer on the shaped mesh backing having a thickness of 800 μm after drying. The shaped product was subsequently heat treated at two elevated temperatures as described in the foregoing examples resulting in a shaped product with a complicate shape involving shaped protrusions, fins, indentations and holes and a total void volume of 90% in the thin-walled sections including the mesh backing.

What is claimed is:

1. A method for producing a shaped three-dimensional sintered porous body comprising the steps of:

dispersing and suspending a fiber mixture comprising inorganic fibers and a liquid containing an organic binder to form a fibrous slurry;

applying the slurry to a three dimensional configured mesh sheet comprising through openings distributed throughout and over the surface of the mesh sheet forming from the slurry a wet fibrous three dimensional configured fibrous body comprising the fiber mixture attached to the sheet and complementary to the sheet configuration, the applying step including spraying the slurry onto the mesh sheet and simultaneously de-watering the sprayed sheet to form a de-watered fibrous body;

drying the fibrous body attached to the sheet;

removing the binder from the dried fibrous body; and subsequently fusing the inorganic fibers to form a sintered porous fibrous body with the three-dimensional configuration.

2. A method for producing a shaped three-dimensional sintered porous body comprising the steps of:

dispersing and suspending a fiber mixture comprising inorganic fibers and a liquid containing an organic binder to form a fibrous slurry;

applying the slurry to a three dimensional configured mesh sheet comprising through openings distributed throughout and over the surface of the mesh sheet forming from the slurry a wet fibrous three dimensional configured fibrous body comprising the fiber mixture attached to the sheet and complementary to the sheet configuration;

the applying the slurry step including dipping the mesh sheet into the slurry, applying a suction to the mesh sheet such that the slurry is de-watered through said mesh sheet forming the fibrous body on the sheet;

drying the fibrous body attached to the sheet;

removing the binder from the dried fibrous body; and subsequently fusing the inorganic fibers to form a sintered porous fibrous body with the three-dimensional configuration.

3. A method for producing a shaped three-dimensional sintered porous body comprising the steps of:

dispersing and suspending a fiber mixture comprising inorganic fibers and a liquid containing an organic binder to form a fibrous slurry;

applying the slurry to a three dimensional configured mesh sheet comprising through openings distributed throughout and over the surface of the mesh sheet forming from the slurry a wet fibrous three dimensional configured fibrous body comprising the fiber mixture attached to the sheet and complementary to the sheet configuration;

said applying said slurry comprising injecting the slurry into a cavity including at least one surface formed by said mesh sheet to form the fibrous body within the cavity on the at least one surface and then dewatering the slurry contained in the cavity on the sheet with a suction;

drying the fibrous body attached to the sheet;

removing the binder from the dried fibrous body; and subsequently fusing the inorganic fibers to form a sintered porous fibrous body with the three-dimensional configuration.

4. A method for producing a shaped three-dimensional sintered porous body comprising the steps of:

dispersing and suspending a fiber mixture comprising inorganic fibers and a liquid containing an organic binder to form a fibrous slurry;

applying the slurry to a three dimensional configured mesh sheet comprising through openings distributed throughout and over the surface of the mesh sheet forming from the slurry a wet fibrous three dimensional configured fibrous body comprising the fiber mixture attached to the sheet and complementary to the sheet configuration;

drying the fibrous body attached to the sheet;

removing the binder from the dried fibrous body;

subsequently fusing the inorganic fibers to form a sintered porous fibrous body with the three-dimensional configuration;

and then coating the sintered fibrous body with a catalyst.

5. The method according to claim 4 wherein the fiber mixture is dispersed and suspended in water to form a water-based slurry, and further including the step of de-watering the fibrous body.

6. The method according to claim 4 including forming said binder of any one of the group consisting of cellulose, organic resins including polyvinyl alcohol, polyurethanes, and styrenebutadiene latex, and thermosets, including epoxies, ureaformaldehyde resins, melamine-formaldehyde resins, and polyamide-polyamine epichlorohydrin resins.

7. The method according to claim 4 including controlling the ratio of binder to inorganic fiber in the fiber mixture such that the sintered body exhibits a predetermined porosity.

8. The method according to claim wherein the inorganic fibers are selected from the group consisting of any one or more of metallic fibers, ceramic fibers, glass fibers, carbon fibers and coated fibers.

9. The method according to claim 4 wherein the fusing and sintering step includes heating the three dimensional configured fibrous body at a temperature below the melting point of the inorganic fibers but sufficiently high to achieve a partial fusion and a sintering of the contact surfaces between the fibers.

10. The method of claim 4 including forming apertures and fins on said body during said forming.

11. The method of claim 4 wherein the forming step includes simultaneously forming the body as a sheet member with a plurality of undulations.

12. The method according to claim 4 wherein the porous sheet member is a steel mesh cloth.

13. The method according to claim 4 further including wetting the dried fibrous body prior to removing the binder and then forming the wet body into a three dimensional shaped body.

14. The method according to claim 4 including forming the porous sheet member into a three dimensional configuration prior to applying the slurry so that the slurry is formed into the three dimensional configuration complementary to the support configuration.

15. The method according to claim 10 wherein the porous sheet member is a screen.

16. The method according to claim 4 including storing the dried body, later wetting the stored body, shaping the wet body into a three dimensional configuration and then continuing with the subsequent steps of removing the binder and fusing the inorganic fibers.

17. A method for producing a shaped three-dimensional sintered porous body comprising the steps of:

dispersing and suspending a fiber mixture comprising inorganic fibers and a liquid containing an organic binder to form a fibrous slurry;

dispersing and suspending a catalytic material in the slurry applying the slurry to a three dimensional configured mesh sheet comprising through openings distributed throughout and over the surface of the mesh sheet forming from the slurry a wet fibrous three dimensional configured fibrous body comprising the fiber mixture attached to the sheet and complementary to the sheet configuration;

drying the fibrous body attached to the sheet;

removing the binder from the dried fibrous body; and subsequently fusing the inorganic fibers to form a sintered porous fibrous body with the three-dimensional configuration.

18. A method for producing a sintered porous body comprising the steps off:

forming a fibrous slurry of dispersed and suspended fiber mixture comprising inorganic fibers and a liquid containing an organic binder;

applying the slurry to a porous sheet member support of a given configuration to simultaneously form the slurry into a wet fibrous sheet member body comprising the fiber mixture attached to the support and complementary to the support configuration;

the applying step including applying a vacuum to one side of the sheet member, dipping the sheet member in the slurry to attract a layer of the slurry to a side of the sheet member opposite the one side with the vacuum and then withdrawing the sheet member from the slurry;

drying the fibrous body attached to the support;

removing the binder from the dried fibrous body; and subsequently fusing the inorganic fibers to form a sintered porous fibrous body with the sheet member configuration.

* * * * *